(12) United States Patent
Hobden et al.

(10) Patent No.: US 8,536,533 B2
(45) Date of Patent: Sep. 17, 2013

(54) DETECTION DEVICE

(75) Inventors: Mervyn Keith Hobden, Lincoln (GB); Robert Anthony Sareen, Buckinghamshire (GB)

(73) Assignee: E2V Technologies (UK) Limited, Chelmsford, Essex (GB)

(*) Notice: Subject to any disclaimer, the term of this patent is extended or adjusted under 35 U.S.C. 154(b) by 852 days.

(21) Appl. No.: 12/593,943

(22) PCT Filed: Mar. 31, 2008

(86) PCT No.: PCT/GB2008/001115
§ 371 (c)(1),
(2), (4) Date: Jan. 6, 2010

(87) PCT Pub. No.: WO2008/119971
PCT Pub. Date: Oct. 9, 2008

(65) Prior Publication Data
US 2010/0140475 A1     Jun. 10, 2010

(30) Foreign Application Priority Data

Mar. 30, 2007 (GB) .................................. 0706301.9
Aug. 23, 2007 (GB) .................................. 0716481.7

(51) Int. Cl.
*G01J 5/02* (2006.01)

(52) U.S. Cl.
USPC ................ 250/370.01; 250/338.1; 250/336.1; 250/341.1

(58) Field of Classification Search
USPC .................... 340/426.1, 426.24, 426.26, 552, 340/554, 557; 250/370.01, 336.1, 341.1, 250/338.1
See application file for complete search history.

(56) References Cited

U.S. PATENT DOCUMENTS 3,403,399 A    9/1968   Jacobs et al.
5,047,783 A    9/1991   Huguenin et al.
(Continued)

FOREIGN PATENT DOCUMENTS

DE    4332042 C1    3/1995
EP    0442562 A1    8/1991
(Continued)

OTHER PUBLICATIONS

Machine Translation of JP 2002-257932.*
(Continued)

*Primary Examiner* — David Porta
*Assistant Examiner* — Yara Green
(74) *Attorney, Agent, or Firm* — Venable LLP; Robert Kinberg; Thomas A. Negley (57) ABSTRACT

Reflective means comprising substrates, selectively reflects electromagnetic radiation whose frequency lies between $3 \times 10^9$ Hz and $10^{13}$ Hz, and includes, for example, a layer of high resistivity silicon, on which the radiation is arranged to be incident, and means for selectively generating charge carriers in the layer to reflect the radiation, for example, by illuminating a face of the substrate with electromagnetic radiation whose wavelength lies between 5 µm and 100 mn in order to generate the charge carriers. The reflective means may form part of an imaging device in which a scene to be imaged is illuminated by radiation which passes through the reflective means in a coaxial arrangement, the reflected radiation being received by the reflective element while the reflective region is scanned over its entire surface, to produce a stream of radiation reflected from the scene which can be detected and used to drive a display. Noise produced by reflection from areas of the reflective means other than the scanned spot may be reduced by crossed polarizers, and the substrates may be grooved to form the polarizers, as well as to simplify the scanning arrangement. Other applications are for chemical signature detection.

30 Claims, 8 Drawing Sheets

(56) References Cited

U.S. PATENT DOCUMENTS

| | | | |
|---|---|---|---|
| 5,157,538 A * | 10/1992 | Soref | 359/245 |
| 5,227,800 A | 7/1993 | Huguenin et al. | |
| 5,262,796 A * | 11/1993 | Cachier | 343/909 |
| 5,360,973 A * | 11/1994 | Webb | 250/370.01 |
| 5,455,590 A | 10/1995 | Collins et al. | |
| 5,807,257 A | 9/1998 | Bridges | |
| 5,822,477 A | 10/1998 | Crouch | |
| 6,313,803 B1 * | 11/2001 | Manasson et al. | 343/756 |
| 6,777,684 B1 | 8/2004 | Volkov et al. | |
| 6,870,162 B1 | 3/2005 | Vaidya | |
| 6,967,612 B1 | 11/2005 | Gorman et al. | |
| 2002/0140624 A1 | 10/2002 | Webb et al. | |

FOREIGN PATENT DOCUMENTS

| | | | |
|---|---|---|---|
| EP | 1643264 A1 | 4/2006 | |
| GB | 1605119 | 12/1981 | |
| GB | 2372171 B | 7/2002 | |
| GB | 2411729 A | 9/2005 | |
| JP | 63269807 A | 11/1988 | |
| JP | 11097925 A | 4/1999 | |
| JP | 2002-257932 | 9/2002 | |
| WO | WO-92/21993 A1 | 12/1992 | |
| WO | WO 93/26059 | 12/1993 | |
| WO | WO-03/098323 A1 | 11/2003 | |
| WO | WO-2006/028397 | 3/2006 | |
| WO | WO-2006/131910 | 12/2006 | |

OTHER PUBLICATIONS

Japan Patent Office Action Dated Jun. 11, 2012.

Search Report issued by the UK Intellectual Property Office in Application No. GB 0706301.9 dated Nov. 9, 2007.

Search Report issued by the UK Intellectual Property Office in Application No. GB 0716481.7 dated Oct. 31, 2007.

Search Report issued by the UK Intellectual Property Office in Application No. GB 0716481.7 dated Sep. 26, 2007.

Search Report issued by the UK Intellectual Property Office in Application No. GB 0706301.9 dated Jul. 19, 2007.

Fekete, et al. "Active optical control of terahertz reflectivity of high-resistivity semiconductors" *Optics Letters*, vol. 30, No. 15 (Aug. 2005).

Hofer, et al. "Visible Displays of Submillimeter and Millimeter Wave Images." Presented at the Symposium on Submillimeter Waves, Polytechnic Institute of Brooklyn, Mar. 31-Apr. 2, 1970.

Jacobs, et al. "Proposal for fog penetrating Imaging Device," *Proceedings of the IEEE*, vol. 54, Issue 6 (Jun. 1966).

Smith, F., "A New Incident Illuminator for Polarizing Microscopes." *Mineralogical Magazine* vol. 33, No. 264 (Mar. 1964).

Karpowicz, Nicholas et al., "Compact Continuous-Wave Subterahertz System for Inspection Applications," Applied Physics Letters, AIP, American Institute of Physics, vol. 86, No. 5, p. 54105, Jan. 28, 2005.

Bezborodov, V.I. et al., "Quasi-Optical Antenna Duplexers, International Journal of Infrared and Millimeter Waves," vol. 18, No. 7, pp. 1411-1422, Jul. 1, 1997.

Fickenscher T., "Optically Controlled Broadband Millimeter Wave Beam-Splitter-Type Coupler," International Journal of Infrared and Millimeter Waves, vol. 25, No. 3, pp. 553-567, Mar. 1, 2004.

* cited by examiner

PRIOR ART

FIG. 1

PRIOR ART

FIG. 2

PRIOR ART

DETECTION DEVICE

This invention relates to detection devices, especially to detection devices operating in the region of the electromagnetic spectrum extending from $3\times10^9$ Hz to $10^{13}$ Hz.

Electromagnetic radiation within the THz (Terahertz) band of frequencies ($10^{10}$ Hz to $10^{13}$ Hz) is useful for detecting concealed objects, since the radiation passes through materials opaque to visible radiation such as clothing. Like infrared radiation, people naturally emit such radiation, and the naturally-emitted radiation can be used to form an image of a person revealing concealed objects carried by the person. Since the radiation is relatively close in frequency to that of visible radiation, lenses can be used to focus the radiation. Images can be further improved by actively illuminating the subject with the radiation, rather than relying on the passively generated rays.

Figure 1:
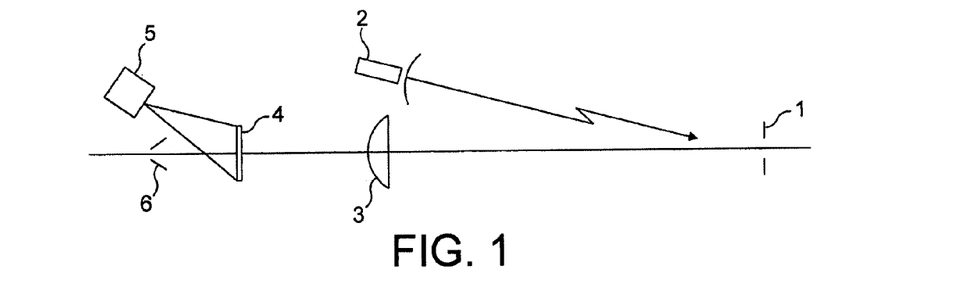
FIG. 1 shows the overall arrangement of a prior art, detecting device.
Figure 2:
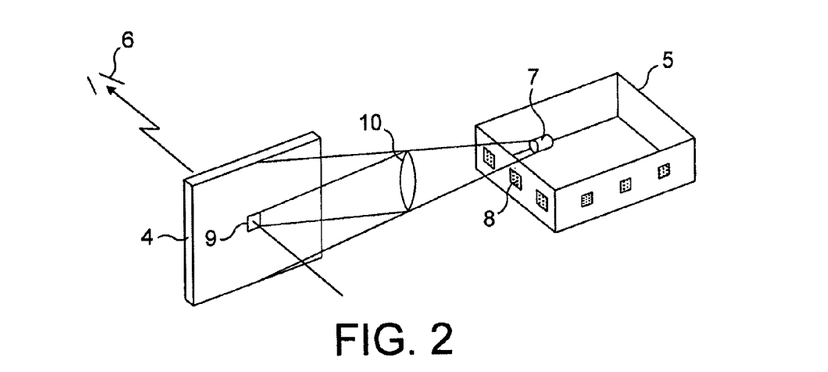
FIG. 2 shows the scanning arrangement of the detecting device of FIG. 1 in more detail.

In one proposal (R. C. Hofer, H. Jacobs and J Schumacher, Visible Displays of Submillimeter and Millimeter Wave Images, Electronic Components Lab., US Army Electronics Command, Fort Monmouth, N.J., presented at the Symposium on Submillimeter Waves, Polytechnic Institute of Brooklyn, March 31, April 1 and 2, 1970), an object 1 is illuminated with radiation from a klystron 2 operating at 70 GHz, as shown in FIG. 1 which shows the overall arrangement of the proposed system. Radiation reflected back from the object is focused by a lens 3 of dielectric material onto a semiconductor panel 4. In order to view the image, use is made of the semiconducting properties of the panel: when illuminated by light it is opaque to radiation from the klystron, but when unilluminated, it is transparent to that radiation. Accordingly, a scanning mechanism 5 scans a small area of shadow over the otherwise illuminated panel. A detector 6 receives the radiation corresponding to the scanned shadow, thereby producing a sequential signal from which an image of the object 1 can be reconstructed. FIG. 2 shows the image dissection process of the arrangement of FIG. 1 in more detail. The scanning mechanism 5 operates by running in front of a projector 7 a continuous tape with regularly spaced opaque spots 8 which are incrementally displaced from each other in a vertical direction. The resulting shadow 9 is focussed by a lens 10 onto the semiconductor panel 4, which it scans in raster-fashion.

Figure 3:
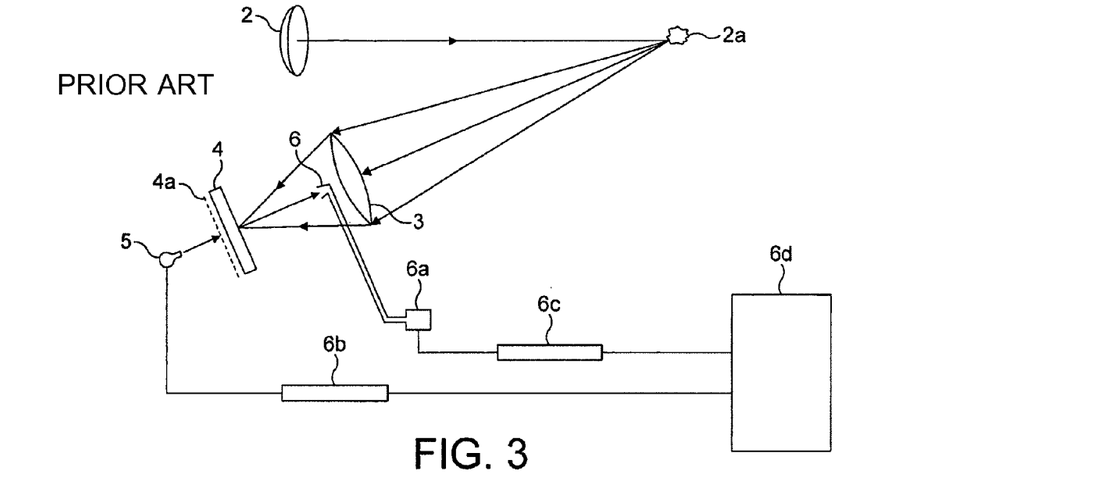
FIG. 3 shows the overall arrangement of a second prior art detecting device.

In another proposal (Proposal for fog penetrating imaging device, by H. Jacobs, R. C. Hofer, G. Morris, Proc. IEEE, Vol. 54, Issue 6, p 907, June 1966), shown in FIG. 3, a semiconductor panel 4, backed by a wire mesh, is scanned by a flying spot of light 5 on one face to increase the local conductivity and hence reflectivity to millimeter wave radiation impinging on its other face, and an image of an object from which such radiation is reflected is scanned in this way. The object 2a to be imaged is illuminated with millimeter waves from an illuminator 2, and the reflected radiation is focussed by lens 3 onto the panel 4, the reflected ray from which is received by a horn 6 and fed to a detector 6a. The image is viewed on display 6d, which receives the detected signal from detector 6a via an amplifier 6c, and has an input 6b providing information on the scanning of the flying spot. It is noted that the authors believed, based on their work with a transmissive Germanium system, that a fairly thick layer of semiconductor was necessary to provide the required reflectivity. Within the scope of the present invention, this view has been shown to be false.

The property of high-resistivity semiconductor material to reflect terahertz radiation, believed to be due to optically-created photocarriers has been separately noted (Active optical control of the terahertz reflectivity of high-resistivity semiconductors, by L Fekete, J. Y. Hlinka, F Kadlec and P Kuzel, and P Mounaix, Optics Letters, Vol. 30, No. 15, Aug. 1, 2005).

The invention provides a detection device comprising a source of electromagnetic radiation whose frequency lies between $3\times10^9$ Hz and $10^{13}$ Hz for illuminating a scene, reflective means comprising semiconductor material on which the radiation reflected from the scene is arranged to be incident, a scanner for scanning over a surface of the reflective means an area in which charge carriers are selectively generated to render that area reflective, and a detector positioned to receive the radiation reflected from the reflective means, wherein the source is arranged to illuminate the scene through the reflective means.

This permits the detection device to be compact, as well as permitting minimal optical aberration.

Advantageously, the detection device includes polarisers to reduce reflections from the reflective means over areas in which charge carriers are not generated. The use of polarisers in this way enables the sign-to-noise ratio to be improved.

Advantageously, the reflective means comprises a pair of substrates, and the scanner includes means for selectively illuminating respective strips on the surface of each substrate. This enables the scanning to be simplified.

Advantageously, the reflective means is a semiconductor material, for example, silicon. The silicon may have a resistivity in excess of 500 ohm-cm, advantageously in excess of 5 kohm-cm, preferably in excess of 50 kohm-cm, because such material would be expected to have a high carrier lifetime and therefore be an efficient photoconductor. The reflective means may be a volume of semiconductor or a surface layer.

The reflective means is made operative by the generation of the charge carriers, thereby changing the direction of the radiation reflected from the scene. It is possible for the charge carriers to be generated thermally, electrically or optically, or a combination of these. For example, the substrate may be provided with an injector, or an array of injectors, together with an applied bias, in order to generate the carriers electrically. However, in a preferred form, the charge carriers are generated by selectively illuminating the substrate with electromagnetic radiation whose wavelength lies between 5 μm and 100 nm (optical radiation), dependent on the semiconductor material used.

The scanner may be a mechanical scanner, or it may comprise an array of optical sources each arranged to illuminate an element of the substrate. The scanning may be in a raster pattern, or a pattern, which depends on the image from the scene being received.

For frequencies from $3\times10^9$ Hz to $10^{11}$ Hz, the detection device may be used for guidance purposes, for example, on an airborne platform, and for frequencies from $10^{10}$ HZ to $10^{13}$ Hz, the detection device may be used for screening purposes, for example, for screening persons for the presence of weapons or explosives. An imaging device is desirable for the first aim, but would not be necessary for the second, where the absorption characteristics or other chemical signature of the subject would be determined.

The source of electromagnetic radiation may be continuous wave although, in for some applications, it might be desirable for the radiation to be pulsed.

Ways of carrying out the invention will now be described in detail, by way of example, with reference to the accompanying drawings, in which:

FIG. 9b is a plan view of the reflective means shown in FIG. 9a;

Throughout the drawings, like reference numerals have been given to like parts.

The detection devices of the invention have various applications. In the case of radar frequencies (from $3 \times 10^9$ Hz to $10^{11}$ Hz), the detection devices can be used as part of a guidance system, or for other radar applications. In the case of millimetric frequencies (from $10^{10}$ Hz to $10^{13}$ Hz), the detection devices can be used for security screening. For chemical signature detection, it is not necessary for the detection device to form an image of the scene illuminated. In many security-screening applications, it is desired to obtain an image, and the embodiments of the invention described hereinafter with reference to the drawings are imaging devices.

Figure 4:
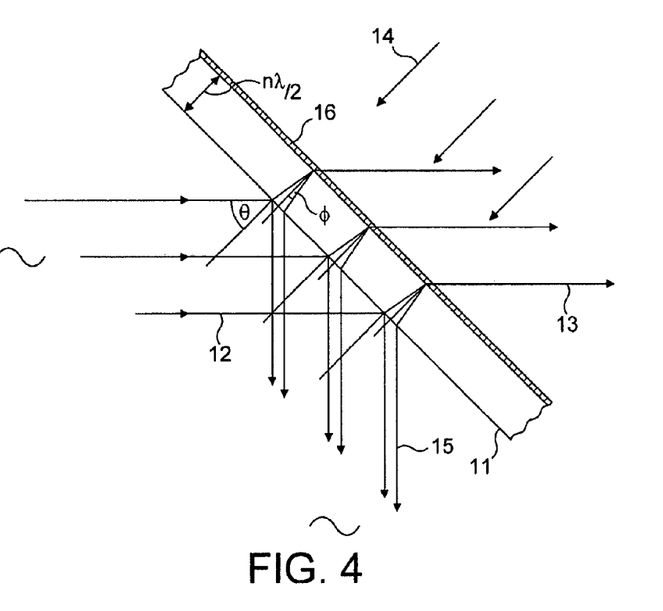
FIG. 4 is a ray diagram showing in section a reflective means suitable for use in the detecting devices of the invention.

Referring to FIG. 4, a reflective means suitable for use in the detecting devices of the invention comprises a planar substrate of high resistivity (that is, greater than 5 k ohm-cm) silicon semiconducting material 11. The thickness of the substrate will vary depending on the frequency of the incoming radiation. The thickness is liable to be more than 100 µm thick, but thicknesses of 500 µm, 1000 µm and 5000 µm have been employed. The thickness may also arranged to be an integral number of half-wavelengths thick at the frequency of the incoming millimetric radiation, so as to minimise Fabry-Perot reflections at the surface of the silicon. Any planar thickness of dielectric material, differing in dielectric constant from the surrounding medium, is capable of operating as an etalon due to multiple beam interference at a critical wavelength. It is noted in what follows, that a layer of induced charge displacement, by optical or other means, not only produces inherent reflectivity, but is also capable of tuning the etalon to enhance or degrade the total reflectivity, by altering the effective dielectric constant and therefore the total effective thickness Radiation 12 whose frequency lies between $10^{10}$ Hz and $10^{13}$ Hz is incident on the substrate, and is transmitted through in the same direction 13 when the substrate is not illuminated with optical radiation. When the substrate is illuminated with optical radiation 14, the incoming radiation 12 is reflected by the substrate along direction 15. Hence, by switching the optical radiation on and off, the reflective means is switched between a reflective and a transmissive mode.

FIG. 4 shows a small element of the substrate. The full area of the substrate is not shown. The substrate-illuminating beam is scanned over the full area of the substrate in some desired scanning pattern, e.g. a raster scan. Thus, an image of incoming radiation focussed onto the substrate is dissected and converted into a sequential beam corresponding to each element of the image in turn, allowing a simple detector to be used which can drive a visual display.

The face of the substrate on which the optical radiation falls is provided with a quarter wavelength anti-reflective layer 16 at the wavelength of the illuminating radiation, the refractive index of the coating being the square root of that of silicon, that is, approximately 1.85.

It is believed that the mechanism underlying the reflective effect is that the optical excitation creates a dense cloud or "plasma" of electrons, and the resulting periodic array of positively ionised atoms in the semiconductor lattice. It is this division of charge into the electron plasma and the periodic array of ions which is responsible for the Radio Frequency wave reflection, forming in effect a periodic array of charge displacement that allows lateral as well as longitudinal coherence to be established with the incoming electrical wavefront. The energy equivalent to the optical wavelength needs to be greater than the band gap of the semiconductor material. The conditions in the silicon need to be such that when the carriers are generated a large fraction does not recombine. Hence it is necessary to use a relatively pure silicon crystal free from impurities that would put energy levels in the centre of the forbidden gap.

Intrinsic silicon is suitable. For example, silicon with a resistivity exceeding 100 K ohm-cm can be considered intrinsic (carrier density in N-type would be about $1 \times 10^{10}$ per cubic centimeter). This material would be expected to have a high carrier lifetime because the lack of impurities results in a lack of scattering centres.

Examples of suitable optical radiation sources are a tungsten filament lamp, a red or near IR, LED, or a solid state laser. This gives a range of frequencies from the near infrared at 1 µm to just beyond visible at 0.7 µm: the preferred operational range of optical radiation with silicon is 850 to 950 nm. This operational range depends on the position of the absorption edge of the particular semiconductor being used. Above the adsorption edge, the semiconductor is transparent, and interaction with the optical radiation is very weak.

The surface of the substrate on which the illuminating radiation is incident is treated in a way that reduces its reflectivity by the provision of anti reflective coating 16 but instead, or in addition, the surface may be covered with inverted pyramid shaped dimples produced by preferential etching. Such dimples enable more light to enter the substrate.

One example of a suitable substrate material is N-type 60 k ohm-cm silicon. This is produced by starting with P-type silicon and back doping with phosphorous. It is slightly over compensated in favour of the phosphorous. The high resistivity silicon of the substrate is predominantly N-type with a shallow donor level at 40 milli-electron volts below the bottom of the conduction band. This means that electrons in the donor level are readily excited into the conduction band by a wavelength of $1.24/0.04=31$ microns. This is much longer than the infrared radiation which is the efficient producer of charge but the donor level will be ionised at room temperature and compared to the number of silicon atoms there are many less donors. Therefore the main mechanism for adding more charge will be by excitation across the bandgap.

An alternative material is lithium compensated silicon, that is, silicon which is treated so that lithium ions bond with residual boron impurities and any defects or dislocations. A typical resistivity would be greater than 100 kohm-cm. Again, the primary mechanism will be the excitation of electrons from the valence band across the band gap.

Other high resistivity silicon materials may be used, and other semiconducting materials, for example, GaAs may also be used. If desired, the substrate may be coated on the back face with a quarter-wavelength (at the frequency of the incoming radiation) anti-reflection layer designed to prevent internal reflection of the incoming radiation. Such a coating would be composed of a dielectric, or a stack of dielectric layers whose mean refractive index is the square root of that of the semiconductor. As another alternative, the back face of the substrate may be wedged, that is, inclined rather than parallel to the front face, in order to separate the internally reflected radiation from the beam 15.

While the charge carriers are generated in the bulk of the substrate by the optical radiation, the charge carriers may be generated instead by electrical means such as electrodes, and these may be arranged in an array in order to scan the reflective are across the surface of the silicon substrate.

Figure 5:
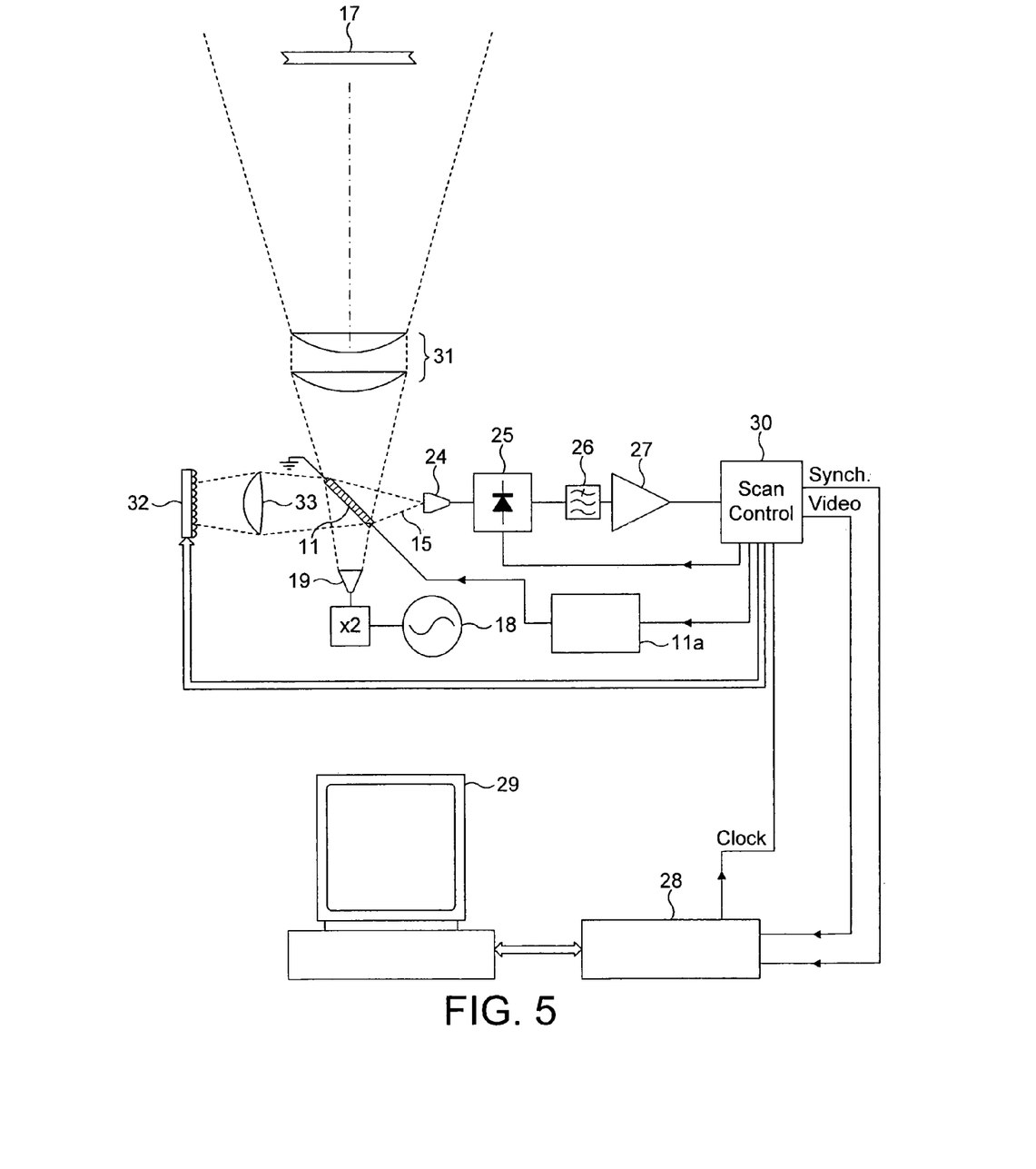
FIG. 5 is a schematic diagram of a first detecting device according to the invention.

Referring to FIG. 5, a first imaging device uses a silicon substrate 11 as described with reference to FIG. 4: this can be either an array of discrete elements or a continuous sheet. A target 17 to be imaged is illuminated by electromagnetic radiation within the range of from $10^{10}$ Hz to $10^{13}$ Hz (millimetric) generated by a Gunn diode oscillator 18 and radiated by a waveguide horn antenna 19. A compound wide-angle lens system 31 focuses the radiation reflected back from the target onto the focal plane of a receiving horn 24 via reflection in the substrate 11.

A flying spot of optical electromagnetic radiation is produced by an array 32 of LEDs, producing, in this case, radiation of wavelength 800 to 950 nm (although other wavelengths in the near infrared could be used) which is focussed on the opposite side of the silicon substrate 11 to that on which the millimetric radiation is incident. The LEDs of each row are sequentially illuminated in turn, so that the flying spot of optical radiation raster scans the substrate. A corresponding sequential stream of millimetric radiation, reflected by the instantaneous spot, is received by receiving horn 24, and an image is produced on a display 29.

In the manner explained with reference to FIG. 4, each area in turn of the silicon substrate changes from being transmissive to millimetric radiation to being reflective to that radiation as the spot is incident. The receiving horn 24 receives the resulting serial stream of millimetric radiation 15, and feeds it to a sampling detector 25, the output of which is filtered by filter 26 and amplified by amplifier 27. Via a digital interface 28, a video image is shown on a display 29 using a scan controller 30.

Advantage is taken of the fact that the silicon substrate 11 remains transparent to millimetric radiation over all of its area except for the flying spot of light, by illuminating the target 17 coaxially through the substrate. This millimetric radiation illuminates the target 17 via the lens system 31, and the reflected radiation from the target is focussed by the same lens system 31 into the focal plane of the horn 24, via reflection by the silicon substrate 11. The silicon substrate may be either a continuous sheet or an array of discrete elements.

The face of the silicon substrate which is illuminated optically can be provided with an anti-reflection coating like the coating 16 shown in FIG. 4, which does not affect the millimetric radiation which impinges on the reverse surface. Also, bias may be applied by means of bias supply 11a to enhance the sensitivity of the semiconductor array to near infra-red radiation, for example, in conjunction with an array of electrodes.

The frequency of the source 18 may be 250 GHz, being derived from a 125 GHz Gunn diode oscillator and a X2 multiplier 18a. If desired, the multiplier may be omitted. Lower operating frequencies such as 94 GHz may be used.

Instead of electronic scanning of the flying spot, it could be done mechanically if desired, for example using a Nipkow disc scanner or a Mihaly-Truab mirror drum, or a system of synchronised oscillating mirrors to give the horizontal and vertical scanning.

An important point is that the transmitted radiation partakes of nearly the complete aperture of the lens. This is vital to maintain the numerical aperture of the illuminating system. The receiving system is scanned by the selective excitation of a small area of the beam splitter surface. This uses the principal of image dissection, in order to give Rayleigh resolution of the received aperture. The minimum size of the selective area is $\lambda/2$ at the operating wavelength, in line with the Rayleigh theory.

In order to provide the image dissection of the receive channel, a portion of the semiconductor beam splitter's surface is excited so as to produce an excess of carriers in that area. This may be carried out optically or, electrically, or a combination of the two. Numerous attempts have been made in the past to produce semiconductor shutters based on either switched transmissivity, or reflectivity of a semiconductor. Most have attempted to explain the results of experimental observation using classical Drude/Debye modeling in the bulk of the material. In the case of this invention, the experimental evidence confirms that as far as reflectivity is concerned, the Drude/Debye model is incorrect. Reflectivity is the result of carrier excitation very close to the excited surface—a layer only a few microns thick. Attenuation in the bulk of the material is due to phonon scattering. Local reflectivity due to carrier excitation alone does not exceed much more than 53%, and this is independent of the semiconductor thickness. This allows the design of a beam splitter, which gives good reflectivity (−3 dB conversion loss), but whose attenuation loss in transmission is always low, outside the excited area. If the beam splitter thickness when unexcited, is made close to $n\lambda/4$, where n=1, 3, 5, etc, then the total reflectivity at the front surface is enhanced, as there is a phase change of $\lambda/2$ on reflection at the back surface, and a total change in path length of $2\times\lambda/4$ for the reflected ray. The reflected phase at the front surface is therefore $\lambda$, and the reflected ray adds to that of the incident ray, enhancing total reflectivity.

If however the thickness is made an even number of $n\lambda/4$, where n=2, 4, 6, etc, the opposite occurs, the phase change of the reflected ray is $\lambda/2$ at the front surface, opposing the incident ray, and reflectivity is diminished.

The understanding of the nature of the excited reflecting layer, and its confinement close to the illuminated surface, allows the use of a thin semiconductor beamsplitter, thereby minimising the optical aberrations introduced into the system by refraction through the beamsplitter thickness.

Figure 6:
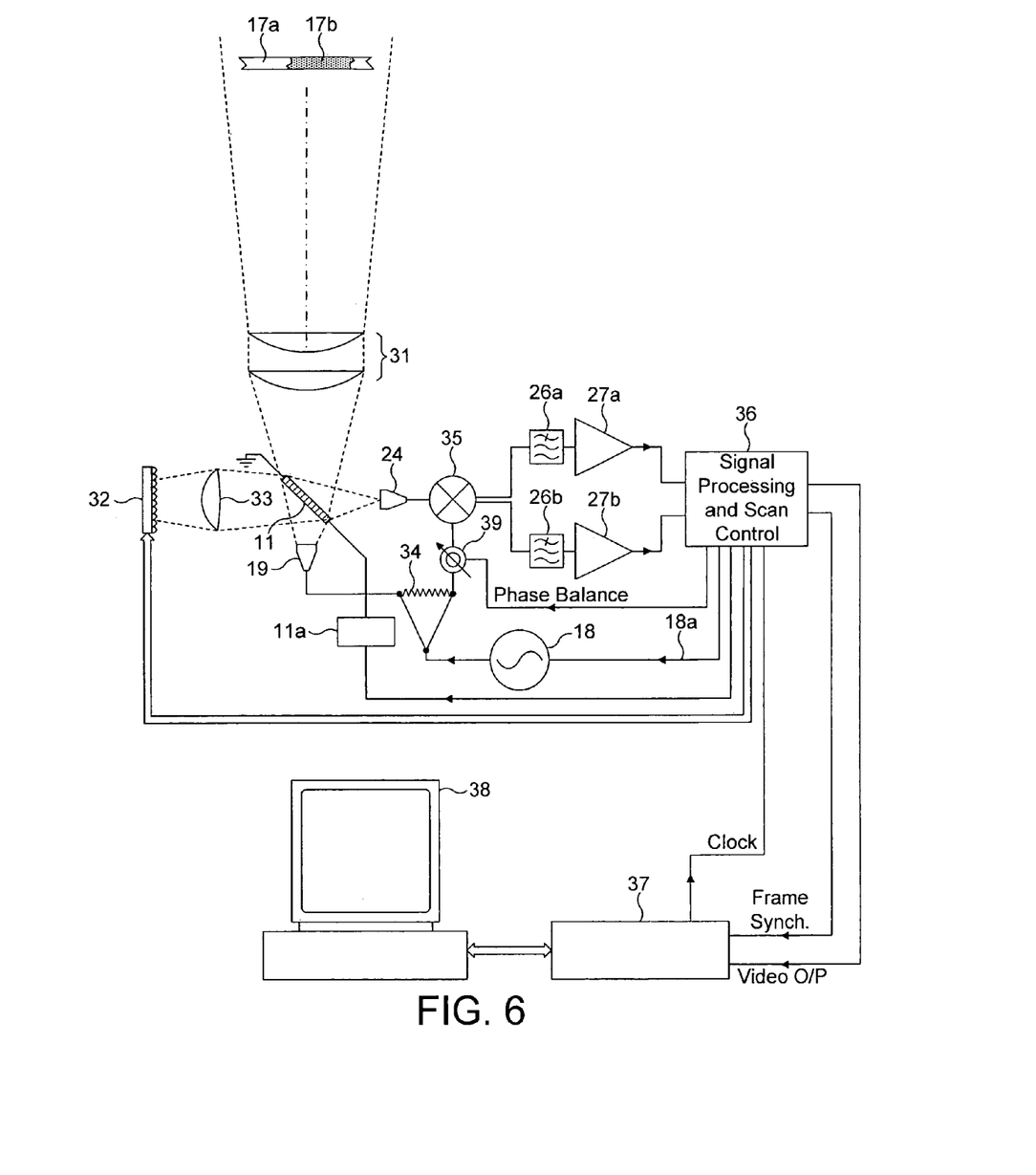
FIG. 6 is a schematic diagram of a second detecting device according to the invention.

Referring to FIG. 6, the second imaging device differs from the first in that the output of the receiving horn antenna 24 is split into in-phase and quadrature channels, taking advantage of the coherent nature of the radiation from the Gunn diode, to enable any amplitude and phase difference from radiation reflected by different parts of the target to be measured. Thus, the Gunn diode oscillator 18, which in this embodiment is tuned to 190 GHz, feeds the transmitting horn 19 via a hybrid coupler 34. The hybrid coupler feeds part of the millimetric signal to a mixer 35 as a local oscillator signal, to enable in-phase and quadrature channels to be recovered from the reflected and scanned millimetric radiation collected by receiving horn 24. Each channel is provided with anti-aliasing low-pass filter 26a, 26b and an amplifier 27a, 27b. A signal processor and scan control 36 outputs a signal to digital interface 37 that drives a display 38.

If the target includes within its structure a composite surface having adjacent areas 17a, 17b, with different dielectric constants, millimetric radiation reflected will have passed through the layer 17a, 17b twice, once in the outward direction, and once in the return direction. Each traversal of the layer will result in a phase difference between the radiation passing through area 17a compared to that through area 17b. For example, if the dielectric constant of region 17a was such that one complete wavelength was exactly accommodated in its thickness, there would be more or less than one complete wavelength accommodated within region 17b.

If, now, any change in amplitude at the output of the mixer at the transition for one setting of phase shifter 39 is compared with the change in amplitude at another setting of the phase shifter, this can be used to obtain information about the variation in dielectric constants at the transition, in the same way as a phase contrast microscope uses amplitude variations for different phase shifts to yield information about the change in refractive index across a viewed sample. For example, two different settings of the phase shifter could correspond to the difference between a peak and a trough of the millimetric wavetrain through region 17a, but between different points on the wavetrain through region 17b, resulting in different relative amplitudes.

The signal processing and scan control unit 36 enables the amplitude and phase of the millimetric radiation from each incremental part of the target to be compared, enabling the phase difference between two adjacent areas to be detected. This information will yield information about the target in the same way as a phase contrast microscope does, by selective operation of phase shifter 39 in the local oscillator feed to the mixer.

The phase shifter 39 allows continuous alteration of the local oscillator phase by at least ±90° at any point in the frequency domain. Therefore the image contrast due to pathlength change at any frequency may be altered by $\pm\lambda/4$, or a total change of approximately 2 mm across the aperture of the image at, say, 94 GHz, with a pro rata change at higher frequencies as the wavelength decreases. The total programmable change in path length will be given by the relative shift in wavelength with total frequency excursion.

Figure 7:
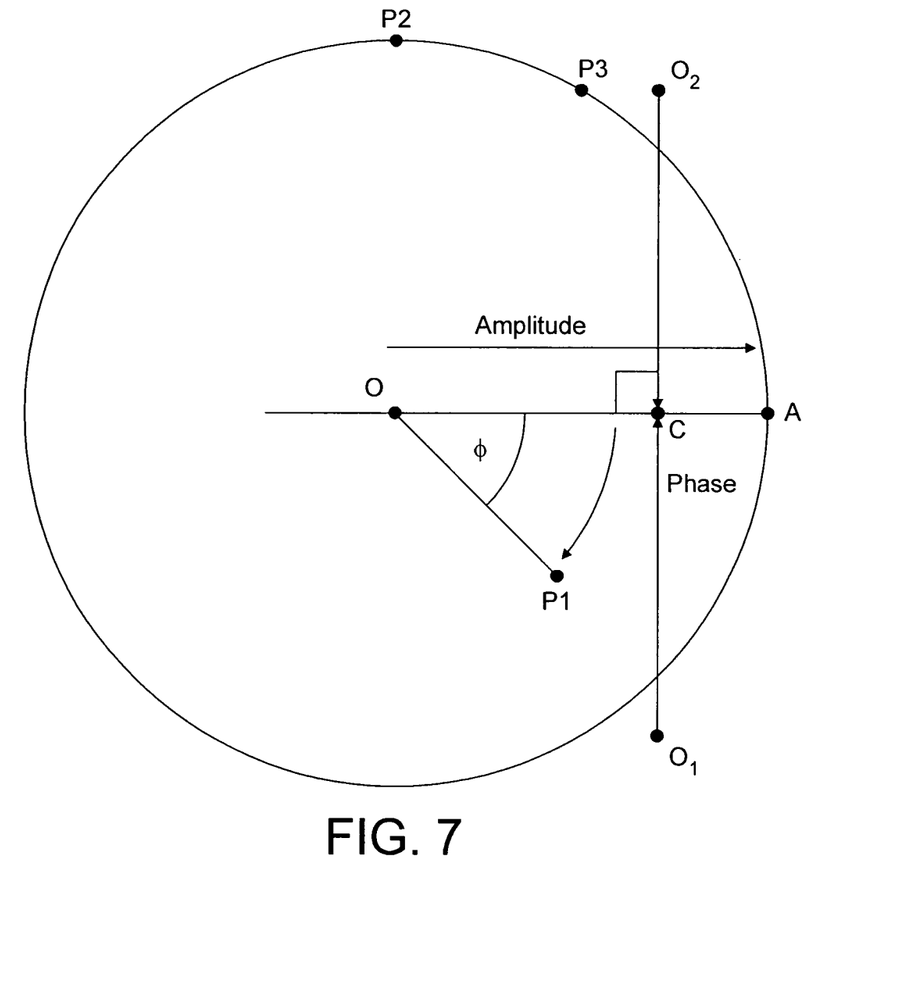
FIG. 7 is a diagram explaining the operation of the phase shifter of FIG. 6.

The operation of the phase shifter may be understood by reference to FIG. 7. This is a simplified vector diagram, where the length of a vector, such as OA represents the amplitude of the returned signal, and points falling around the circumference of circle with OA as radius represent the relative phase of the vector, with respect to OA. If OA represents the zero order radiation, reflected along a path with zero absorption, and no relative phase shift, other than that due to change in range, then a vector falling at the point $P_1$, relative to OA, is shifted in phase by the angle $\phi$, and in amplitude by the difference between OA and O $P_1$. This difference is reflected in the outputs in the two channels from the quadrature detector. To transform the relative amplitudes of the signal components into a measurable contrast, a phase shift is introduced between the transmitted phase and the reference phase in the homodyne mixer. If this phase difference is exactly 90°, then taking the average vector OC as the background magnitude at zero phase, then this shifts the origin from O to $O_1$ or $O_2$, dependent on whether the reference vector leads or lags the transmitted vector. The vectoral sum of OC and $O_1C$ or $O_2C$ is now transformed into a difference in amplitude proportional to the difference in path length, brightening or darkening parts of the image. The effective contrast between the image and the background will obviously reverse for the two vectors $O_1C$ or $O_2C$. If however, the ratio between light and dark changes at a different rate for different parts of the image, this change is directly proportional to the difference in relative path length, and therefore difference in refractive index between those areas. A very important aspect of the invention is that by the use of scanned reflective means, it is possible to ensure that both the zero order radiation illuminating the target, and the reflected retuned signal are both subject to exactly the same optical aberrations, without the imposition of a large leakage signal in the receiver, such as that seen in a simple FMCW radar. Leakage signals are reduced in the ratio of the scanned spot size to the total area scanned and the inherent directivity of the beamsplitter, which greatly improves the overall dynamic range.

The system may also use frequency modulation of the Gunn diode oscillator 18 along line 18a to provide sufficient dispersion to allow variations of dielectric constant of the material in the field of view to be imaged, and differentially measured. With sufficient frequency excursion, 500 MHz to 2 GHz, compensation for target glint can also be used, allowing surfaces with pronounced curvature or rapid change in dielectric constant to be consistently imaged.

It would be possible to program the scanner to identify particular changes in dielectric constants or values of dielectric constant.

For this embodiment, it would be possible to omit the reflective scanning means and employ a detector which selectively detects the radiation across a small area of the total image.

Figure 8:
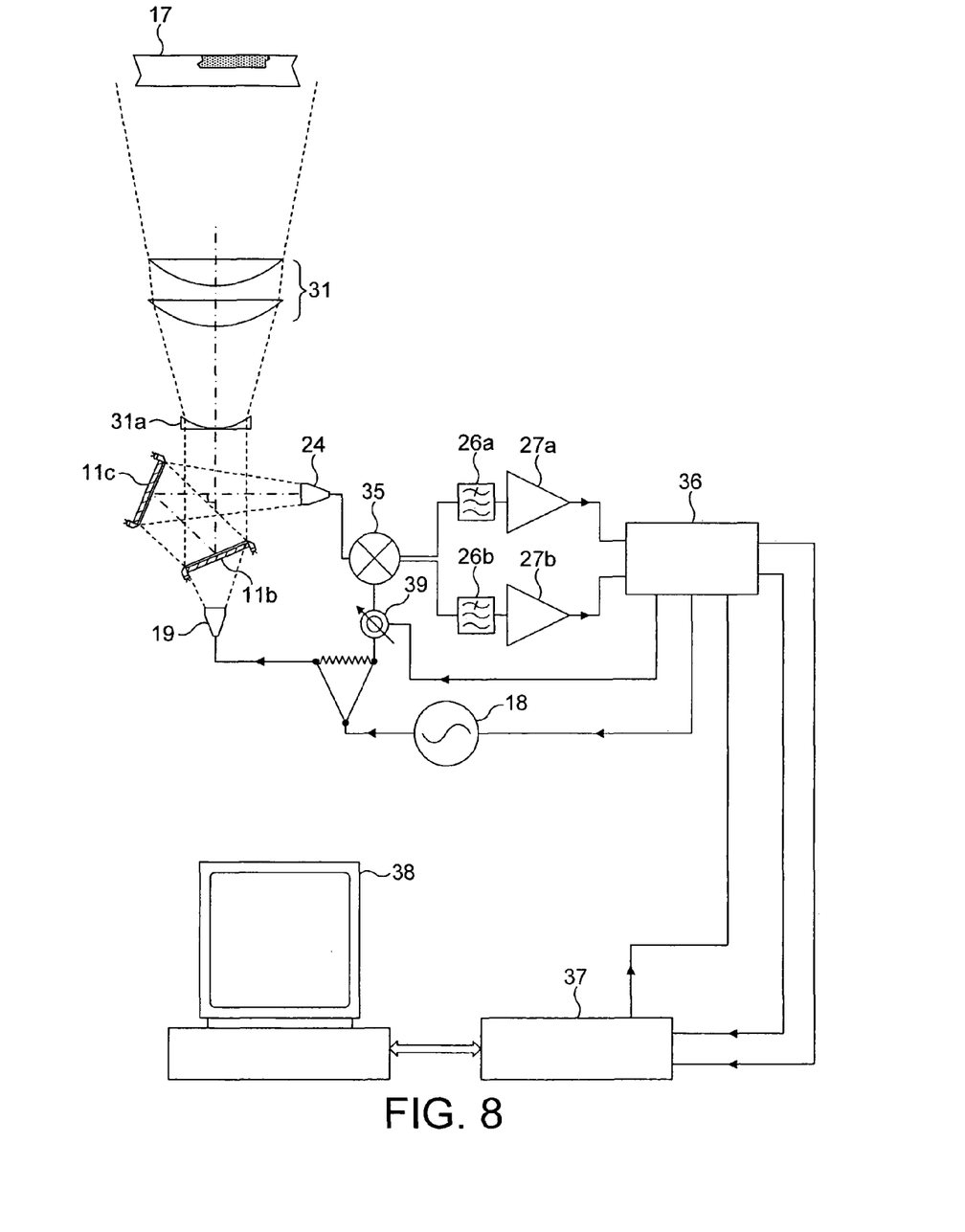
FIG. 8 is a schematic diagram of a third detecting device according to the invention.
Figure 9A:
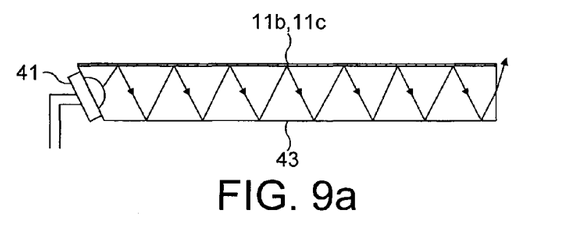
FIG. 9a is a front elevation of one of the reflective means shown in FIG. 8.
Figure 9B:
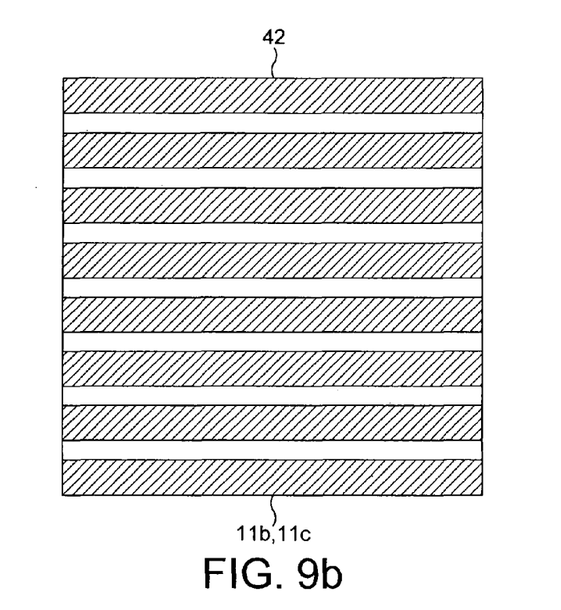
Figure 9C:
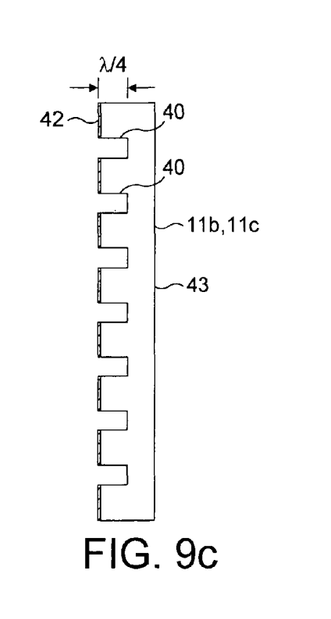
FIG. 9c is a sectional view of the reflective means shown in FIG. 9b.
Figure 10:
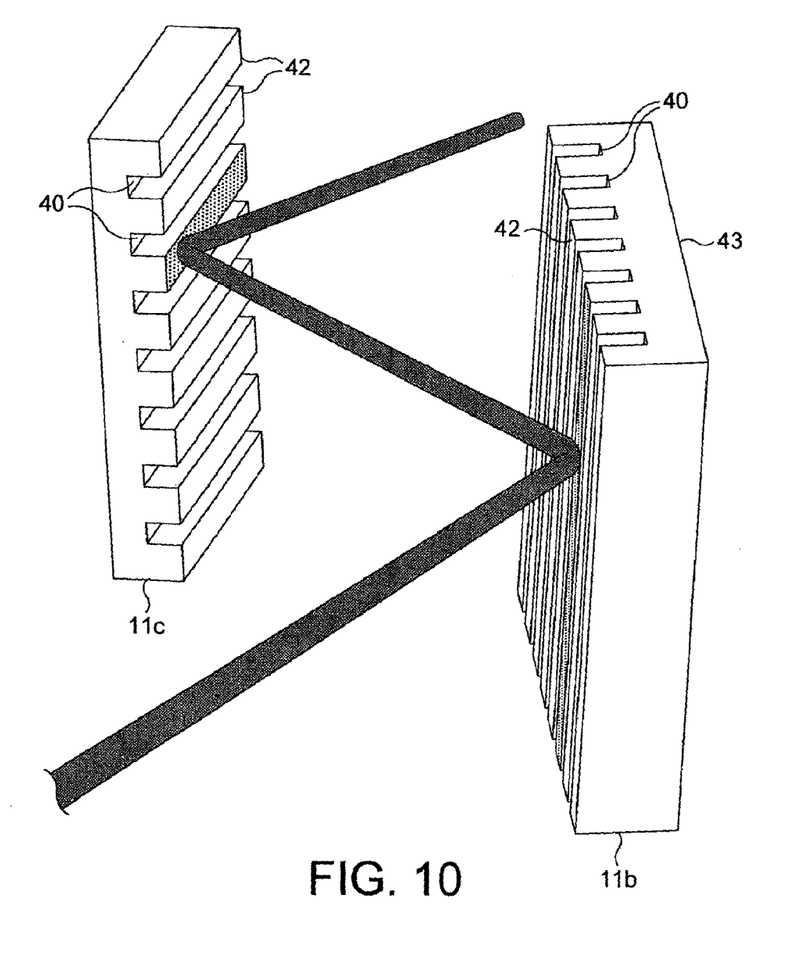
FIG. 10 is a perspective view of the reflective means shown in FIG. 8 on an enlarged scale.

A disadvantage of the imaging devices described is that the signal received in the receiving horn 24 from the reflective flying-spot-illuminated region of the semiconductor substrate is accompanied by noise in the form of reflections from the non-illuminated regions of the substrate, since although the non-illuminated regions are not rendered reflective by an electron gas layer, nevertheless there is a change of refractive index at the substrate, and this change of index produces reflection, which can only be partially compensated for by means of an anti-reflection layer. Referring to FIGS. 8 to 10, the third imaging device differs from the second by using two reflecting semiconducting substrates in place of one, which permits an improved method of scanning the substrate to be used, as well as other advantages.

The scanning method will first be described. The scene 17 is illuminated with radiation from Gunn diode oscillator 18. The path for millimetric radiation returned from the target 17 is folded because the single high-resistivity silicon semiconductor substrate 11 of FIGS. 5 and 6 is replaced by a pair of high-resistivity silicon semiconductor substrates 11b and 11c. This has several advantages.

The first advantage is in a simplified method of scanning the reflective spot over the image of the scene received back from the lens system 31, 31a. Each of the semiconductor substrates 11b, 11c is provided with a series of equally spaced grooves 40. At one end of each substrate, a series of LEDs 41 are provided (FIG. 9a), one for each surface strip 42 lying on each side of the grooves 40, the output of which is aimed at the surface strip 42. From there it is reflected to the mirror formed by the very thin chrome layer 43 at the bottom of the substrate. The result is that each LED 41 illuminates, from the underside, the surface of its associated strip 42, along its whole length, by virtue of the repeated reflections undergone by the light from the LED. Each LED, however, only illuminates the surface of its adjacent strip, and not the surface of the others. In fact, an LED is arranged at each end of each strip, but only the LED at the left hand end of the strip is shown in FIG. 9a. It will be further noted that the strips 42 are arranged orthogonally (FIG. 10). For example, the strips 42 might run vertically for the substrate 11b in FIG. 8, and horizontally for the substrate 11c. As shown in FIG. 10, the third vertical strip from the near edge of the substrate 11b is illuminated, and the third strip down for the horizontal strips of the substrate 11c is illuminated.

It will be appreciated that the transmitting horn 19 illuminates the scene 17 through the entire area of the substrate 11b, and that the reflected radiation impinges on the entire areas of the substrates 11b and 11c. However, the only regions of the scene that is received by the horn 24 due illumination of the strips is that area whose horizontal extent is determined by the illumination of the third vertical strip on the substrate 11b, and whose vertical extent is determined by the illumination of the third strip 42 on substrate 11c. It will be apparent that the whole area of the scene can be scanned by illuminating one horizontal strip and one vertical strip at a time. Thus, for example, the scene could be scanned by first illuminating the uppermost horizontal strip, together with each of the vertical strips in turn. Then the next uppermost horizontal strip could be illuminated, together with each of the vertical strips in turn, etc.

The scanning is thus simplified compared to using an array of LEDs.

The provision of two reflecting substrates, rather than the one of the imaging devices of FIGS. 6 and 8, provides other advantages as well.

In addition to the signal received at the receiving horn 24 due the illuminated area, the horn also receives reflections from the whole area of each substrate that arises from the change of refractive index at the air/semiconductor interface at the surface of each substrate. It has to be borne in mind that the transmitted radiation from the horn 19 is plane polarised, and that the radiation reflected from the scene will also be generally plane polarised as well. That being the case, it might be thought that this undesired reflection could be removed from the received radiation by placing a crossed polariser in front of the receiving horn 24, or incorporating a polariser into the horn itself. Unfortunately, the reflections at the substrate surfaces introduce some ellipticity into the reflections, with the result that the orthogonal component thus introduced will pass any such crossed polariser at the horn 24.

The amount of ellipticity introduced depends on the angle of incidence of the millimetric radiation on the substrate. It is found, following a discovery by F H Smith, that the smaller the angle of incidence, the less the amount of ellipticity introduced. (Mineralogical Magazine, Vol. 33, March 1964, No. 264, pp 725-729). In FIG. 8, the included angle between the substrates 11b, 11c is 45°, and the angle of incidence of the radiation to each substrate is 22.5°. Thus one of the advantages of having two reflecting substrates is that it is then possible to introduce less ellipticity than for the first two imaging devices, where the angle of incidence is 45°.

In addition, the grooves 40 result in the substrates 11b, 11c forming a pair of crossed reflective waveplates, so that the substrates themselves provide the crossed polarising action referred to. Radiation falling on substrate 11b in FIG. 10 is reflected as vertically polarised, and the radiation falling on substrate 11c is reflected as being horizontally polarised. (The radiation reflected from the intersection of the illuminated strips is not polarised by the substrates). The width of the strips in a surface direction at right angles to the direction in which they extend is an integral number of half wavelengths of the millimetric radiation, preferably one half of one wavelength, and the depth of the grooves 40 is an odd multiple of quarter wavelengths of the millimetric radiation, preferably one quarter wavelength in depth. This depth, together with the multiple of half-wavelengths strip width, causes the layer of the substrate from the face down to the bottom of the grooves to act as a quarter-wavelength anti-reflection layer. This serves to reduce the strength of the undesired elliptical components introduced at the reflections. The quarter-wavelength depth results in cancellation of radiation reflected from the surface of the strip and the bottom of the groove, and the total volume of the semiconductor material left in this layer on each plate is sufficient to reduce the effective refractive index in the layer to that of the square root of the refractive index of the base semiconductor beneath the grooves, so that the layer acts as a matching layer. The width of the strips should not be less than half a wavelength of the millimetric radiation; otherwise the insertion loss of the complete device increases rapidly.

The lens system 31, 31a includes a negative element 31a in order to flatten the field. to reduce oblique reflections from the non-illuminated regions of the substrates 11b, 11c and therefore differences in polarisation across the complete aperture. Such an element could also be provided in the imaging devices of FIGS. 5 and 6.

The imaging devices of FIGS. 5, 6 and 8 all have the advantage that coaxial illumination provides inherent isolation between the illuminating source and the receive path, exploiting the known directive capability of an optical beamsplitter. This also applies to the double plate design of FIG. 8, as well as to the single plate designs of FIGS. 5 and 6. Isolation greater than −50 dB is readily achieved; this is considerably better than that available from more conventional millimeter-wave diplexers in microstrip or waveguide. Illumination of the target through the reflective means loses about 50% of the incident radiation; this is absorbed in an orthogonal, terminated port, and a further loss occurs due to the screening off of the areas of the two active scanning strips in the FIG. 8 embodiment. For this embodiment, a typical width for each strip for 250 GHz millimetric radiation will be 1.2 mm wide. Assuming a 40×40 array, this gives a total plate size of 60×60 mm. The blocking caused by the two illuminated strips is therefore about 4% of the total 250 GHz illuminated area, or about 0.2 dB extra insertion loss across the whole aperture of the imager.

Modifications may, if desired, be made to the imaging devices without departing from the scope of the invention. Thus, ¼ wave plates could be used with the embodiments of FIGS. 5 and 6, so as to transmit RH circular polarisation, and to receive LH circular. This would reduce the effect of reflections from the non-illuminated regions of the substrate 11. These could be placed in front of the transmitting and receiving horns 19, 24, or, indeed, incorporated into those horns, these being aligned so as to reduce the elliptical component from the non-illuminated areas of the substrate.

Less ellipticity would be introduced with the substrates 11b, 11c of the third imaging device of FIG. 8, and the crossed polarisers could also be placed in front of, or incorporated into, the horns 19, 24, and in this case, the substrates could be plane without grooves in them. It would be necessary for the scanning of the illuminated optical beam to be carried out by some other means, however, such as by the array of LEDs 32. Since the unwanted reflections from the non-illuminated areas of the substrates 11b, 11c arise from the rear as well as the front surfaces of the substrates (a change in index being present in each case), this could be mitigated by arranging the substrate 11c to be wedge-shaped, so that the reflection from the rear face due to the non-illuminated regions is thrown out of the field of view of receiving horn 24.

While the substrates 11b, 11c may be of similar volume composition of high resistivity semiconductor to the substrate 11 used in the imaging devices of FIGS. 5 and 6, and as described in FIG. 4, the substrate may instead comprise a very thin layer only of the high-resistivity semiconductor, confined to the strips 42, (for example, between 25 µm and 5 µm, preferably 10 µm thick), epitaxially deposited on another layer, since the optically excited electron gas creating the conditions for reflection, is a close to surface phenomenon. The other layer may be a transparent layer with no semiconducting properties. The same arrangement may be used in FIGS. 5 and 6, wherein the substrate comprises a thin epitaxially deposited high resistivity semiconductor layer as the active layer, and another layer as the support.

The imaging devices described may be used for security screening purposes. However, detection devices are also within the scope of the invention wherein images are not formed, but rather the absorption characteristics of a subject are investigated. Such devices would tend to operate at higher frequencies, ($10^{11}$ to $10^{13}$ Hz), and be narrower beam in order that they could be used at longer ranges. Such could be modified versions of the imagers of FIGS. 5 to 8, but where the scanning is of a coarse quantisation, for example, eight pixels square. The absorption characteristics could be determined by the phase detection described with reference to FIG. 7, or by using as the illuminating source a pair of quantum cascade lasers operating at different frequencies. The radiation from the lasers is pulsed. The ratio of the returned power at the different frequencies would allow the absorption of the illuminated subject to be determined, allowing the detection of items such as explosives. The scanning at the substrates is used, not for imaging, but to enable the target to be illuminated through the reflective means, as only one pixel will be reflecting and therefore blocked to transmission through the reflective means at any one time. This allows the use of the same image dissection principles shown in the first imager, thereby giving the same improvement to Rayleigh resolution in this device. Thus, one set of optics may be used for both transmission of the laser beams and their return, thereby providing a cost saving.

Such a narrow beam chemical signature detection could be used in conjunction with the imagers described.

At lower, microwave, frequencies, the imagers described could be used in a guidance system carried by airborne platform.

The invention claimed is:

1. A detection device comprising a source of electromagnetic radiation whose frequency lies between $3\times10^9$ Hz and $10^{13}$ Hz for illuminating a scene, a selective reflector comprising semiconductor material on which the radiation reflected from the scene is arranged to be incident, a scanner for scanning over a surface of the selective reflector an area in which charge carriers are selectively generated to render that area reflective, and a detector positioned to receive the radiation reflected from the selective reflector, wherein the source is arranged to illuminate the scene through the selective reflector.

2. A detection device as claimed in claim 1, including polarisers to reduce reflections from the selective reflector over areas in which charge carriers are not generated.

3. A detection device as claimed in claim 2, including means for polarising the radiation transmitted from the source in one state, and means for blocking the reception of radiation polarised in that state in the detector.

4. A detection device as claimed in claim 2, in which the selective reflector comprises a pair of substrates.

5. A detection device as claimed in claim 4, in which the substrates are orientated so that radiation from the scene is incident on them at an angle of incidence less than 25°.

6. A detection device as claimed in claim 4, in which the scanner selectively illuminates respective strips on the surface of each substrate.

7. A detection device as claimed in claim 6, in which the strips are orthogonal to each other.

8. A detection device as claimed in claim 7, in which the substrates have grooved surfaces to define the strips.

9. A detection device as claimed in claim 8, in which the depth of the grooves is an odd multiple of quarter wavelengths of the illuminating radiation.

10. A detection device as claimed in claim 6, in which the width of the strips is a multiple of half-wavelengths of the illuminating radiation.

11. A detection device as claimed in claim 10, in which the width of the strips is one half of one wavelength of the illuminating radiation.

12. A detection device as claimed in claim 6, in which there is provided a separate light source to illuminate the surface of each strip.

13. A detection device as claimed in claim 12, in which each light source is arranged to illuminate each strip from the rear through the material of the substrate.

14. A detection device as claimed in claim 1, in which the source is arranged to emit coherent electromagnetic radiation, and the detector output is arranged to obtain amplitude and phase information.

15. A detection device as claimed in claim 1, in which the semiconductor material is silicon.

16. A detection device as claimed in claim 15, in which the resistivity of the silicon is at least 5 kohm-cm.

17. A detection device as claimed in claim 16, in which the resistivity of the silicon is at least 50 kohm-cm.

18. A detection device as claimed in claim 1, in which the thickness of the semiconductor material is less than 5 mm.

19. A detection device as claimed in claim 18, in which the thickness of the semiconductor material is less than 1 mm.

20. A detection device as claimed in claim 19, in which the thickness of the semiconductor material is less than 0.5 mm.

21. A detection device as claimed in claim 20, in which the semiconductor material is an epitaxial layer less than 25 µm thick, deposited on a support.

22. A detection device as claimed in claim 18, in which the thickness of the semiconductor material is approximately an integral number of quarter wavelengths of the source wavelength.

23. A detection device as claimed in claim 1, in which selectively generating charge carriers includes injecting charge carriers into the semiconductor material.

24. A detection device as claimed in claim 1, in which selectively generating charge carriers includes selectively illuminating the semiconductor material with electromagnetic radiation whose wavelength lies between 5 µm and 100 nm.

25. A detection device as claimed in claimed in claim 24, in which the wavelength lies between 800 nm and 1000 nm.

26. A detection device as claimed in claim 1, in which the detection device is an imaging device.

27. A detection device as claimed in claim 1, in which the detection device forms part of security screening apparatus.

28. A detection device as claimed in claim 1, in which the detection device is arranged to detect the absorption characteristics of the scene.

29. A detection device as claimed in claim 28, including a phase shifter enabling the amplitude and phase information corresponding to a scene to be compared at different phase shifts to produce information about the variation of dielectric constant across the scene.

30. A detection device as claimed in claim 28, in which the source comprises lasers operating at two different frequencies, and the detector is arranged to compare the ratio of the returned power at the two frequencies.

* * * * *